UNITED STATES PATENT OFFICE.

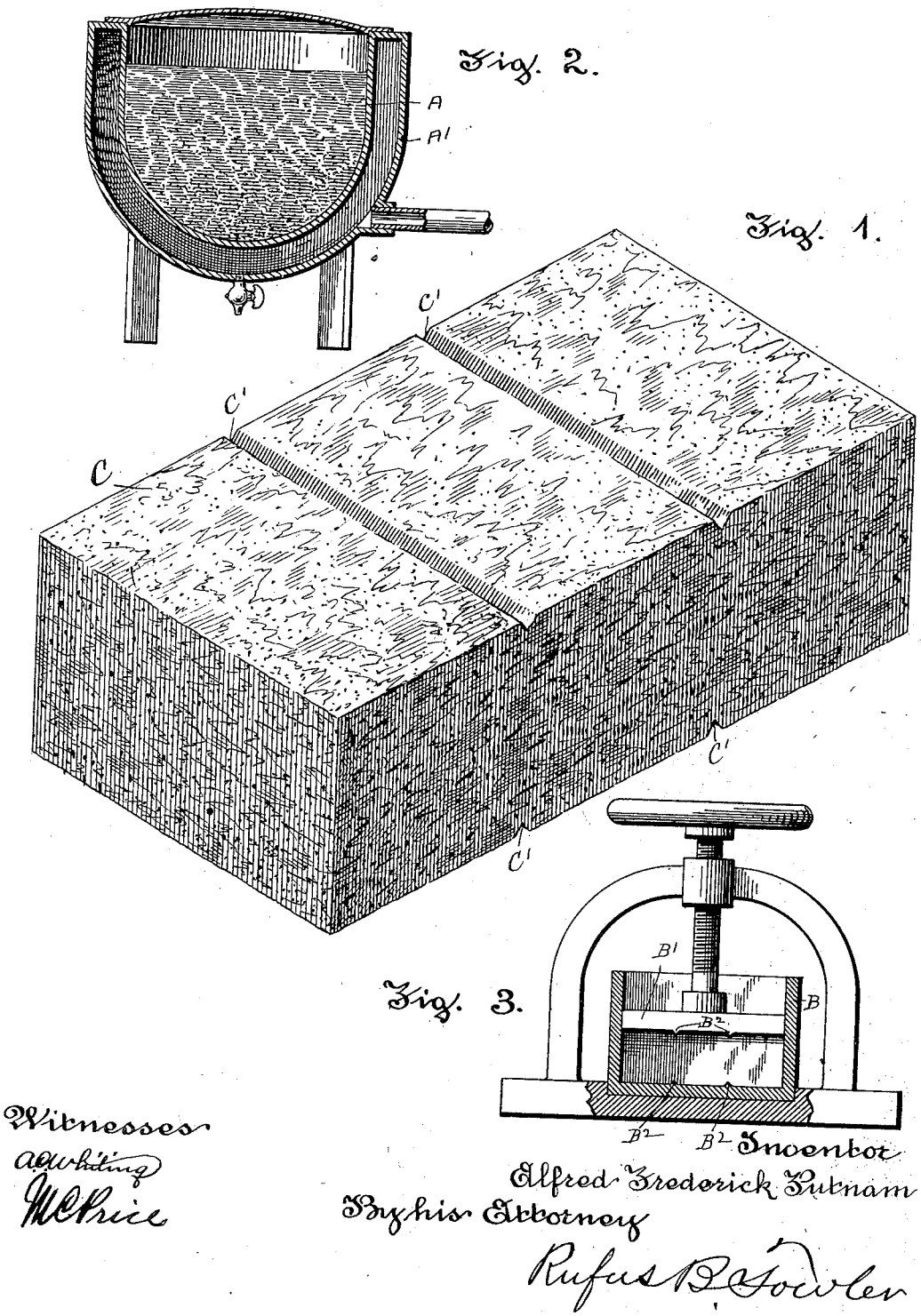

ALFRED F. PUTNAM, OF CHARLTON, MASSACHUSETTS.

FIRE-KINDLER AND METHOD OF MAKING.

SPECIFICATION forming part of Letters Patent No. 697,014, dated April 8, 1902.

Application filed August 2, 1897. Serial No. 646,844. (No model.)

*To all whom it may concern:*

Be it known that I, ALFRED F. PUTNAM, a citizen of the United States, residing at Charlton, in the county of Worcester and State of Massachusetts, have invented a new and useful Improvement in Fire-Kindlers and Methods of Making; and I hereby declare that the following is a full, clear, and exact description thereof, which will enable others skilled in the art to understand and make use of the same.

My invention relates to a composition of matter for use in starting wood or coal fires; and it has for its object to furnish an inexpensive composition of great utility and efficiency which can be readily handled, shipped, and kept any length of time, so as to form a valuable commercial product; and my invention consists in the novel composition of ingredients and the method of combining the same, as hereinafter described, and specifically set forth in the claims hereunto annexed.

In the accompanying drawings, forming a part of this application, Figure 1 is a perspective view of a fire-kindler embodying my invention. Fig. 2 is a central vertical sectional view of the heating apparatus, and Fig. 3 is a central vertical sectional view of a portion of the pressing apparatus.

Similar letters refer to similar parts in the several figures.

In manufacturing my improved fire-kindler I employ powdered resin and sawdust in the proportion of about six (6) ounces of powdered resin and one hundred and eight (108) cubic inches of sawdust, the sawdust being preferably coarse and produced from some resiniferous wood. The sawdust is placed in a kettle or receptacle A, provided with a steam-jacket A', by which the dry heat is imparted to the sawdust by the application of steam in the chamber inclosed between the kettle and the jacket. The steam is employed under a pressure capable of heating the sawdust to about 230° Fahrenheit or more. This process of heating renders the sawdust anhydrous and causes the resinous matter contained therein to appear as an exudation on its outer surface, thereby making the wood extremely light, porous, and compressible. The powdered resin is added to the sawdust and the heat continued, while the compound is thoroughly mixed together in order to secure the more complete adhesion of the particles of sawdust. The method of heating by means of steam under pressure, as described, prevents the scorching or burning of the resin and leaves it highly inflammable, so as to rapidly accelerate the ignition of the kindler when used. The composition during the process of heating swells to about twice its original proportions. When the composition has been thoroughly mixed, it is taken from the kettle and placed in a strong iron mold B, having a follower B', and a pressure is applied to the composition by means of any suitable pressing mechanism sufficient to reduce it to about one-half its original proportions and press it into a brick-shaped block C. (Shown in perspective in Fig. 1.) The mold in which the block is pressed is preferably provided on its inner surface with ribs $B^2$, which form transverse depressions C' in the block, those upon opposite sides being arranged oppositely to each other in order to weaken the block in the plane of the depressions and allow it to be more readily broken when it is desired to use only a portion of the block.

The compressibility of the material of which the block is composed allows its bulk to be greatly reduced in pressing and to form an extremely compact and hard block which furnishes a large quantity of combustible material in a small compass.

The resin is added only in sufficient quantity to cause the particles of sawdust to be held together as the block is handled, and the porous character of the wood promotes a rapid combustion and intense heat.

I am aware that a fire-kindler has been heretofore known and described consisting of a composition of sawdust and resin, which were incorporated together and united by the application of heat, and I am also aware that it is not new to heat sawdust sufficiently to expel the water therefrom prior to its admixture with resin or similar material, and I do not claim either of these features broadly.

I employ sawdust from some resinous wood, such as pine, and I subject the sawdust to a dry heat of 230° or more, which causes the resinous gum contained in the woody fiber to exude, and during this process the woody fiber of the sawdust becomes expanded to about twice its bulk, rendering the sawdust porous and compressible. To the sawdust thus treated I add a small quantity of powdered resin while the sawdust is still hot and then subject the composition to a heavy pressure, which reduces the bulk to about one-half its original proportions.

When non-resinous sawdust is heated sufficiently to withdraw the moisture therefrom, it decreases in bulk, and the amount of heat required is much less than that employed by me. The composition when pressed into the form of a brick has sufficient cohesion to enable it to be handled for the purposes of shipment, while it is sufficiently brittle to enable it to be readily broken in the plane of the transverse depressions C', which consist of triangular grooves molded in the surface of the brick by means of triangular ribs on the inner surface of the mold in which the brick is pressed. Fire-kindlers as heretofore made from a composition of fine non-resinous sawdust and a larger proportion of resin than that used by me form a hard cake, which requires to be deeply scored by a knife while in a plastic state in order to be broken.

What I claim as my invention, and desire to secure by Letters Patent, is—

1. The within-described improvement in the art of making fire-kindlers which consists in thoroughly mixing finely-pulverized resin and coarse resinous sawdust in the proportions of about six ounces of pulverized resin to one hundred and eight cubic inches of coarse resinous sawdust, heating said mixture by the application of dry heat to about 300° Fahrenheit, or sufficiently to cause the resinous matter of the sawdust to appear as an exudation on its outer surface and applying pressure to reduce the mixture to about one-half its original proportions, substantially as described.

2. The within-described fire-kindler composed of finely-pulverized resin and a coarse resinous sawdust in the proportions of about six ounces of resin to about one hundred and eight cubic inches of coarse resinous sawdust, thoroughly mixed together and heated to about 300° Fahrenheit, or until the resinous matter of the sawdust exudes from its surface and the mixture is increased in bulk and applying pressure to reduce the mixture to about one-half its original proportions and form a brick-shaped block by means of a mold adapted to form transverse depressions across the block, substantially as described.

In testimony whereof I affix my signature in presence of two witnesses.

ALFRED F. PUTNAM.

Witnesses:
PHILIE A. SMITH,
WM. J. TAFT.